May 7, 1940.                D. R. McNEAL                2,199,709
                         STRAINING EQUIPMENT
                    Filed March 19, 1938        2 Sheets-Sheet 1

INVENTOR
Daniel Raymond McNeal
BY
Synnestvedt & Lechner
ATTORNEYS

May 7, 1940.   D. R. McNEAL   2,199,709
STRAINING EQUIPMENT
Filed March 19, 1938   2 Sheets-Sheet 2

INVENTOR
Daniel Raymond McNeal
BY
Synnestvedt & Lechner
ATTORNEYS

Patented May 7, 1940

2,199,709

UNITED STATES PATENT OFFICE 2,199,709

STRAINING EQUIPMENT

Daniel Raymond McNeal, Abington, Pa., assignor to Andale Company, Philadelphia, Pa., a corporation of Pennsylvania Application March 19, 1938, Serial No. 196,871

5 Claims. (Cl. 210—152)

This invention relates to straining equipment and particularly to an improved strainer grid and method of manufacture thereof. The invention is especially concerned with that type of strainer known in the art as a rotary strainer, i. e., a strainer in which a disc or spoked wheel carrying a strainer grid is mounted in a casing for relative rotation with respect thereto, means being provided for cleaning the grid without interrupting operation.

One of the primary objects of the invention is the provision of an annular strainer grid adapted to be carried by the strainer wheel, which grid is split to form a plurality of relatively separable sections whereby to facilitate replacement of the grids. In addition, the invention provides an effective method for manufacturing such split grids, the several features of advantage of the method and of the grid itself being pointed out more fully hereinafter in connection with the description of the accompanying drawings in which—

Figure 1:
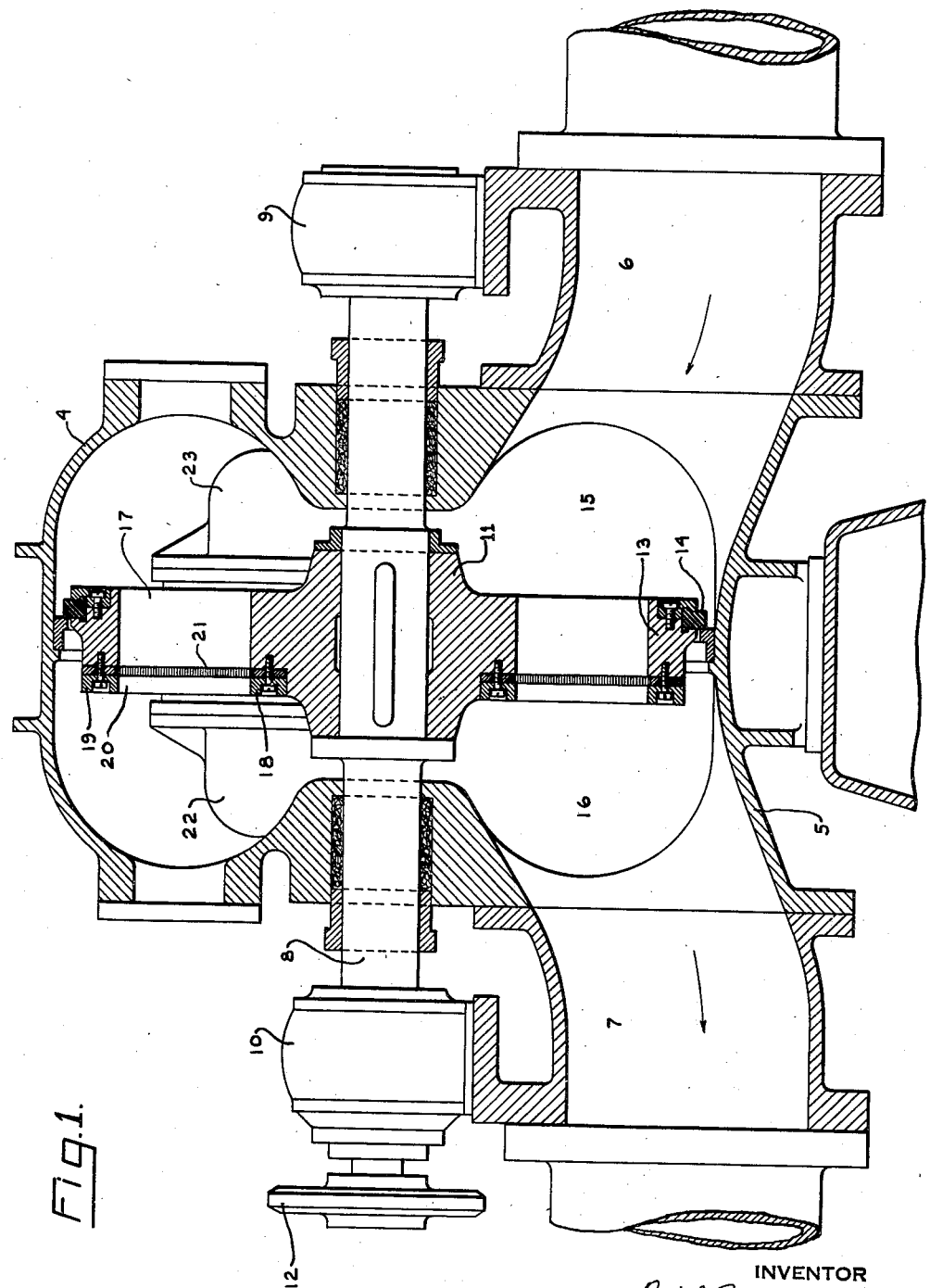
Figure 1 is an axial sectional view through a rotary strainer, the wheel of which carries a strainer grid formed in accordance with the invention.
Figure 2:
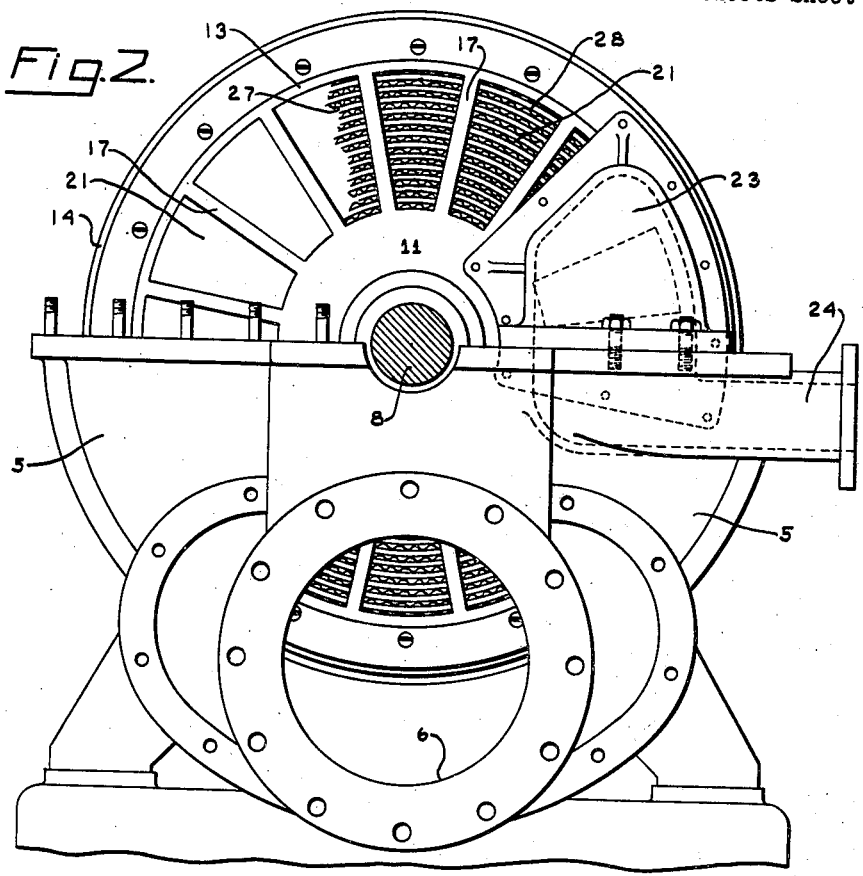
Figure 2 is a side view of the strainer of Figure 1, with the upper portion of the strainer casing removed.

By reference to Figures 1 and 2 it will be seen that the strainer consists of upper and lower relatively separable casing elements 4 and 5, the lower one of which has inlet and outlet connections 6 and 7 for the fluid to be strained. The strainer wheel is mounted on an axis member or shaft 8 having supporting bearings 9 and 10, the wheel being mounted on the shaft by means of a hub 11 keyed thereto to provide for driving of the wheel, as by means of gearing or the like 12.

The strainer wheel carries a peripheral ring 13 having peripheral sealing means 14 cooperating with an inner wall of the casing so that, effectively, the strainer wheel divides the casing into inlet and outlet chambers 15 and 16 in communication, respectively, with the inlet and outlet connections 6 and 7. The strainer wheel is divided into a plurality of pockets or segments by means of radial spokes 17 intervening between the hub 11 and the ring 13. Another spoked member comprising inner and outer rings 18 and 19 interconnected by spokes 20 is bolted to the main part of the wheel, the strainer grid 21 being interposed therebetween.

For the purposes of cleaning the strainer, provision is made for back-flow of fluid through the strainer grid between the inlet and outlet cleaning boxes 22 and 23 respectively. These boxes are positioned within the annular outlet and inlet chambers 16 and 15 and are provided with external connections, one of which appears at 24 in Figure 2, for effecting a circulation of cleaning fluid into box 22 and from there through the section or sections of the strainer passing between the boxes, thus removing debris or the like from the strainer and carrying the same into the outlet cleaning box 23 for external discharge.

The straining and cleaning of the strainer may be carried on continuously by means of the structure referred to above, the general arrangement thereof not being a part of the present invention per se, and therefore being described only briefly herein. For further details, reference may be had to my Patent No. 2,057,497, issued October 13, 1936.

At this time further reference is made to my Patent No. 2,057,498, issued October 13, 1936, disclosing a strainer grid and method of manufacture thereof, which grid is of the general type to which the present invention relates. In said prior patent the straining area of the grid is separated into a number of sections corresponding to the number of sections produced by the spokes of the wheel, this end being achieved by infilling the strainer perforations in radial zones with a moldable material such as Bakelite.

Figure 3:
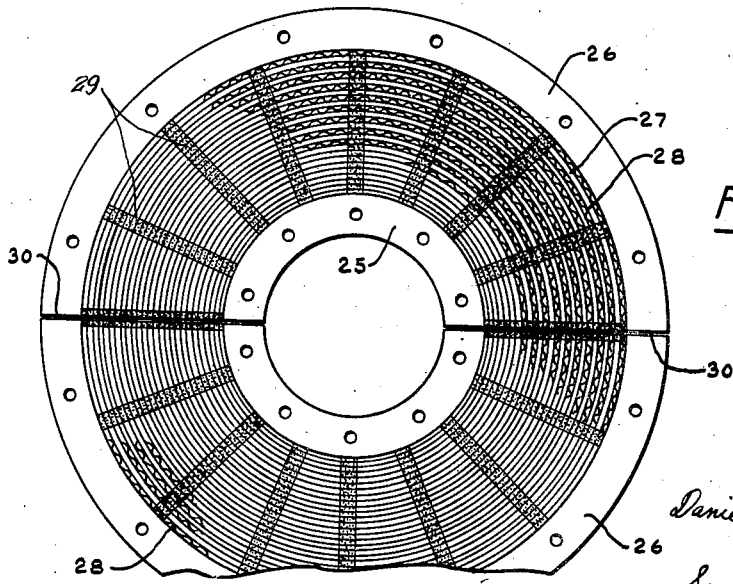
Figure 3 is a face view of a strainer grid made in accordance with the invention.

The present invention also contemplates attainment of the advantages provided for in accordance with my prior Patent No. 2,057,498 (i. e., separation of the strainer area into sections) and, in addition, the present invention provides additional advantages which will be pointed out more fully just below, in connection with the description of Figure 3, to which reference is now made.

As here seen, the grid is generally of annular shape and includes inner and outer rings 25 and 26 between which a plurality of flat strips are spirally wound in the form of an annulus, the edges of the strips being presented at the side faces of the grid. While not essential for some types of service, the strips 27 and 28 are preferably alternately flat and corrugated, thus providing strainer perforations between the several strips of size corresponding to the size of the corrugations. In fabricating the strainer grid the strips 27 and 28 are first spirally wound around an inner ring 25 which is annularly complete.

Thereafter an annularly complete ring 26 is positioned at the periphery of the strainer grid.

Following the above, the strainer perforations in a plurality of generally radially extended zones 29 are infilled preferably with solder to define strainer segments corresponding to the segments formed by the spokes in the strainer wheel. The strainer grid is then cut, as by a saw, into a plurality of separable sections, diametrically aligned points of cutting being indicated at 30—30 in Figure 3. These points of cutting are arranged to fall within two of the radial zones in which the perforations are filled with solder. In addition, solder is preferably employed to bond the outer surface of the inner ring 25 with the adjacent strips, and similarly to bond the inner surface of the outer ring 26 with the adjacent strips. In this way the strainer grid is divided into a plurality of parti-annular sections which may conveniently be applied to and removed from the strainer wheel merely by relatively separating the two spoked members thereof and without necessitating removing the shaft 8 for the strainer wheel from its bearings.

The completed grid 21 is shown in Figures 1 and 2 as being clamped between the two relatively separable parts of the wheel.

In connection with the sawing of the annular grid into several parts, particular attention is directed to the fact that in order to avoid damage to the strips of which the strainer is composed adjacent to the line on which the saw cuts, I have found it to be highly important, if not essential, to employ a material for infilling the perforations in the radial zone through which the cut is made, which material is ductile or malleable, i. e., is not brittle. Any appreciable degree of brittleness in a material employed for this purpose results in fracture during the sawing operation, in consequence of which the ends of the strips adjacent the cut become separated.

The foregoing problem has been especially troublesome heretofore in grids made up of stainless steel strips because of the relatively tough and springable nature of this steel and further because of the difficulty of obtaining an effective bonding or uniting of the infilling material with the strips when made of stainless steel. I have found, however, that these problems are effectively overcome by employing a malleable material united or bonded to the strips, for example, a solder having a relatively low melting point. The low melting point is of advantage in avoiding overheating of the strips such as would impair the stainless characteristics thereof.

I claim:

1. A strainer grid of the character described, the grid being annular and comprising a multiplicity of strips curved substantially around the center of the grid with their edges lying substantially in the planes of the side faces of the grid and providing the strainer perforations therebetween, the strainer perforations in a plurality of generally radially extended zones being infilled with a material uniting said strips and dividing the total straining area of the grid into a plurality of segments, the grid being split through said zones to provide a plurality of parti-annular relatively separable sections.

2. A strainer grid of the character described, the grid being annular and comprising a multiplicity of strips curved substantially around the center of the grid with their edges lying substantially in the planes of the side faces of the grid and providing the strainer perforations therebetween, the strainer perforations in a plurality of generally radially extended zones being infilled with a malleable material united with said strips and dividing the total straining area of the grid into a plurality of segments, and the grid being split through said zones to provide a plurality of parti-annular relatively separable sections.

3. The method of manufacturing a strainer grid of the character described which includes spirally winding a plurality of strips to form a grid of annular shape having spaces therebetween constituting the strainer perforations, closing the strainer perforations in at least two radially disposed zones by infilling the perforations in said zones with a malleable material, and thereafter cutting the strainer grid through said zones to provide a plurality of relatively separable parti-annular sections.

4. The method of manufacturing a strainer grid of the character described which includes spirally winding a plurality of strips to form a grid of annular shape having spaces therebetween constituting the strainer perforations, closing the strainer perforations in at least two generally radially disposed zones by infilling the perforations in said zones with solder bonded to said strips, and thereafter cutting the strainer grid through said zones to provide a plurality of relatively separable parti-annular sections.

5. An annular strainer element comprising a multiplicity of metal strips with their faces presented toward each other and providing the strainer perforations therebetween, the strainer perforations in at least one zone elongated transversely of said strips being infilled with solder bonded to said strips, and the strainer element being split along a line extended transversely of said strips and lying in said zone.

DANIEL R. McNEAL.